(12) United States Patent
Zhang

(10) Patent No.: US 9,973,245 B2
(45) Date of Patent: May 15, 2018

(54) LARGE-SCALE MIMO COMMUNICATION METHOD AND DEVICE IN BASE STATION AND UE

(71) Applicant: Shanghai Langbo Communication Technology Company Limited, Shanghai (CN)

(72) Inventor: XiaoBo Zhang, Shanghai (CN)

(73) Assignee: Shanghai Langbo Communication Technology Company Limited, Shanghai (CN)

( * ) Notice: Subject to any disclaimer, the term of this patent is extended or adjusted under 35 U.S.C. 154(b) by 0 days. days.

(21) Appl. No.: 15/325,610

(22) PCT Filed: Jul. 9, 2015

(86) PCT No.: PCT/CN2015/083668
§ 371 (c)(1),
(2) Date: Jan. 11, 2017

(87) PCT Pub. No.: WO2016/004884
PCT Pub. Date: Jan. 14, 2016

(65) Prior Publication Data
US 2017/0170882 A1    Jun. 15, 2017

(30) Foreign Application Priority Data

Jul. 11, 2014  (CN) .......................... 2014 1 0331122

(51) Int. Cl.
*H04B 7/06* (2006.01)
*H04B 7/0417* (2017.01)
(Continued)

(52) U.S. Cl.
CPC ......... *H04B 7/0417* (2013.01); *H04B 7/0456* (2013.01); *H04B 7/0626* (2013.01); *H04W 88/08* (2013.01)

(58) Field of Classification Search
CPC .. H04B 7/0417; H04B 7/0626; H04B 7/0456; H04W 88/08
See application file for complete search history.

(56) References Cited

U.S. PATENT DOCUMENTS

2015/0282036 A1* 10/2015 Yi ........................... H04L 5/001
                                                                  370/332
2015/0304014 A1* 10/2015 Sadeghi ................ H04J 13/004
                                                                  370/315

(Continued)

*Primary Examiner* — Dac Ha
(74) *Attorney, Agent, or Firm* — Stevens & Showalter, LLP

(57) ABSTRACT

The present invention provides a large-scale MIMO communication method and device in a base station and a UE. In one embodiment, a base station transmits first signaling firstly, wherein the first signaling indicates the configuration information of a first RS, and the first RS includes M RS ports; and then receives second signaling, wherein the second signaling indicates M1 RS ports in the first RS, M is a positive integer greater than 1, M1 is a positive integer smaller than or equal to M, and transmitting cells of the first RS are cells other than transmitting cells of the first signaling. The present invention effectively reduces interference with neighboring cells during Massive MIMO transmission, and solves the problem of SRS contamination. Meanwhile, the present invention is compatible with the existing LTE system as much as possible and has good compatibility.

17 Claims, 3 Drawing Sheets

(51) Int. Cl.
*H04B 7/0456* (2017.01)
*H04W 88/08* (2009.01)

(56) References Cited

U.S. PATENT DOCUMENTS

2016/0006553 A1* 1/2016 Kim .................... H04L 1/1671
370/252
2017/0142699 A1* 5/2017 Kang ................. H04W 72/042

* cited by examiner

LARGE-SCALE MIMO COMMUNICATION METHOD AND DEVICE IN BASE STATION AND UE

CROSS-REFERENCE TO RELATED APPLICATIONS

This application is a U.S. National Phase application under 35 U.S.C. § 371 of International Application No. PCT/CN2015/083668, filed on Jul. 9, 2015, and claims benefit to Chinese Patent Application No. CN 201410331122.9, filed on Jul. 11, 2014, all of which is hereby incorporated by reference for all purposes. The International Application was published in China on Jan. 4, 2016 as WO 2016004884 A1 under PCT Article 21 (2).

BACKGROUND

Technical Field

The present invention is related to a scheme of channel state measurement and feedback in a mobile communication technique field, and more particular to a scheme of downlink channel state measurement and feedback in the mobile communication system adopting Massive MIMO (Multiple Input Multiple Output) technique.

Related Art

In the traditional 3GPP (3rd Generation Partner Project) LTE (Long Term Evolution) system, CSI (Channel Status Information) of the downlink MIMO channel for feedbacking mainly has two manners.

Feedbacking Implicit CSI

A UE (User Equipment) detects a CRS (Cell specific Reference Signal) or a CSI-RS (CSI Reference Signal) to obtain a CIR (Channel Impulse Response) and map it as an implicit CSI. The implicit CSI includes the information of a PMI (Precoding Matrix Indicator), RI (Rank Indictor), a CQI (Channel Quality Indicator), PMI (Precoding Matrix Indicator) and so on.

FIG. 1 is a CSI-RS pattern based on a normal CP (Cyclic Prefix) in an existing LTE system and CRS and DRMS (Demodulation Reference Signal) are identified at the same time, wherein a small square is a minimum resource unit of the LTE—RE (Resource Element). RE filled by the number is a pattern (the number expresses a port index) of the CSI-RS port in a sub frame, RE identified by a cross line may be used for transmitting DMRS, and RE identified by a bold line may be used for transmitting CRS. The LTE system adopts a port concept to define a RS (Reference Signal) resource: one RS port may be mapped to one physical antenna, or a plurality of physical antennas may be combined and superposed to form one virtual antenna. The LTE defines four numbers of CSI-RS port: 1, 2, 4, 8, RE identified by the number in FIG. 1 shows a pattern example of 8CSI-RS port, and the number expresses the port index.

Feedbacking Uplink SRS (Sounding Reference Signal)

The UE transmits an uplink SRS, the system side demodulates the SRS to obtain an uplink channel CSI, and then obtain a downlink CSI according to a link symmetry. The method is mainly used for a TDD (Time Duplex Division) system.

As a new cellular network antenna architecture, a Massive MIMO has recently become a hot topic. A typical feature of the Massive MIMO system is that a number of antenna array unit is increased to a larger value to obtain a series of gain, for example, a system capacity theoretically continues to increase with the increase of antenna number; the coherent superposition of the transmitting antenna signal decreases a transmitting power, etc. When channel between the precoding vector adopted by the serving cell and the UE (User Equipment) of the neighboring cell of the serving cell is parallel (or parallel approximately), a challenge faced by the Massive MIMO is that the downlink precoding operation may bring a larger interference to the neighboring cell. The challenge is especially serious on the SRS contamination. The column vectors $v_1$, $v_2$ are parallel, i.e. $(v_1)^H \cdot v_2 / |v_1\|v_2|=1$, wherein $x^H$, $|x|$ indicates conjugate transpose of x and mod of x.

For the above problem, the present invention discloses a scheme of inter cell interference cancellation of the Massive MIMO transmission.

SUMMARY

The present invention discloses a large-scale MIMO communication method in a base station, which includes the following steps:

step A: transmitting a first signaling, wherein the first signaling indicates the configuration information of a first RS, and the first RS comprises M RS ports; and step B: receiving a backhaul signaling, wherein the backhaul signaling indicates M2 RS ports of the first RS;

wherein the M is a positive integer greater than 1, the M1 is a positive integer less than or equal to the M, and a transmitting cell of the first RS is a cell except a transmitting cell of the first signaling.

In one embodiment, the first signaling is RRC (Radio Resource control) layer signaling. In one embodiment, the second signaling is RRC layer signaling.

In one embodiment, the configuration information includes a RS resource and a RS sequence occupied by the first RS.

In one embodiment, the M1 RS ports are M1 RS ports with the best reception quality in the M RS ports for a transmitting UE of the second signaling.

In one embodiment, the reception quality includes one or both of {RSRP (Reference Signal Reception Power), RSRQ (Reference Signal Reception Quality)}.

In one embodiment, the first signaling is a bitmap with M bits, and the M bits respectively indicates whether the M RS ports are selected.

In one embodiment, the M is configurable.

Specifically, according to an aspect of the present invention, the method further includes the following step:

step C: transmitting a backhaul signaling to a maintenance base station of the transmitting cell of the first RS, wherein the backhaul signaling indicates M2 RS ports of the first RS;

wherein the M2 is a positive integer less than the M.

The base station notifies an interference cell that the M2 RS ports thereof generate a serious interference through the step C, so as to assist the interference cell to avoid to adopt a precoding vector corresponding to the M2 RS ports when transmitting the downlink signal. How to determine the M2 RS ports is implementation-related.

In one embodiment, a transmitting base station of the first signaling and the maintenance base station are different base stations, and the backhaul signaling is transmitted through X2 interface. In one embodiment, the transmitting base station of the first signaling and the maintenance base station are identical base station (i.e. the transmitting cell of the first signaling and the transmitting cell of the first RS are maintained by the same base station), and the backhaul signaling is transmitted in an interior of the base station.

In one embodiment, the M2 RS ports are the M1 RS ports. In one embodiment, the M1 RS ports are a sub set of the M2 RS ports, and the M2 RS ports further include RS ports reported by the UE except the transmitting UE of the second signaling.

Specifically, according to an aspect of the present invention, a pattern of the RS ports in a sub frame reuse a pattern of CSI-RS ports in a sub frame.

Specifically, according to an aspect of the present invention, the RS port is transmitted by P physical antennas deployed for the transmitting cell of the first RS in a precoding manner, and the P is a positive integer greater than 1.

In one embodiment, the M RS ports correspond to M orthogonal precoding vectors. In one embodiment; the P is a positive integer greater than 8.

The present invention discloses a large-scale MIMO communication method in a base station; which includes the following steps:

step A: transmitting a first RS, wherein the first RS comprises M RS ports; and step B: receiving a backhaul signaling, wherein the backhaul signaling indicates M2 MS ports of the first RS;

wherein the M is a positive integer greater than 1, and the M2 is a positive integer less than the M.

Specifically, according to an aspect of the present invention, the method includes the following steps:

step C: determining a precoding matrix according to the backhaul signaling; and step D: transmitting a downlink signal by adopting the precoding matrix in a precoding manner in a given resource.

The base station reduces the interference of the neighboring cell by selecting the appropriate precoding matrix. In one embodiment of the step C, the base station determines the precoding matrix according to the backhaul signaling and at least one of {CSI, SRS} feedbacked by a target UE, and CSI includes one or more of {PTI, RI, PMI, CQI}.

In one embodiment of the step C, the precoding matrix and the precoding vector corresponding to the M2 RS ports are orthogonal. The matrix T and the column vector v are orthogonal, i.e. $T^H \cdot v = 0$.

The given resource includes one or both of {time domain, frequency domain}. In one embodiment, the given resource is determined by the base station itself. In one embodiment, the given resource is indicated by the backhaul signaling.

Specifically, according to an aspect of the present invention, a pattern of the RS ports in a sub frame reuse a pattern of CSI-RS ports in a sub frame.

Specifically, according to an aspect of the present invention, the RS port is transmitted by P physical antennas deployed for the transmitting cell of the first RS in a precoding manner, and the P is a positive integer greater than 1.

The present invention discloses a large-scale MIMO communication method in a UE, which includes the following steps:

step A: receiving a first signaling, wherein the first signaling indicates the configuration information of a first RS, and the first RS comprises M RS ports;

step B: receiving the first RS; and step C: transmitting a second signaling, wherein the second signaling indicates M1 RS ports of the first RS;

wherein the M is a positive integer greater than 1, the M1 is a positive integer less than or equal to the M, and a transmitting cell of the first RS is a cell except a transmitting cell of the first signaling.

In one embodiment, the M1 RS ports are M1 RS ports with the best reception quality in a transmitting UE of the second signaling in the M RS ports.

In one embodiment, the reception quality includes one or both of {RSRP, RSRQ}.

Specifically, according to an aspect of the present invention, a pattern of the RS ports in a sub frame reuse a pattern of CSI-RS ports in a sub frame.

Specifically, according to an aspect of the present invention, the RS port is transmitted by P physical antennas deployed for the transmitting cell of the first RS in a precoding manner, and the P is a positive integer greater than 1.

The present invention discloses a base station equipment, and the base station includes:

a first module, for transmitting a first signaling, wherein the first signaling indicates the configuration information of a first RS, and the first RS comprises M RS ports;

a second module, for receiving a second signaling, wherein the second signaling indicates M1 RS ports of the first RS; and a third module, for transmitting a backhaul signaling to a maintenance base station of the transmitting cell of the first RS, wherein the backhaul signaling indicates M2 RS ports of the first RS;

wherein the M is a positive integer greater than 1, the M1 is a positive integer less than or equal to the M, a transmitting cell of the first RS is a cell except a transmitting cell of the first signaling, and the M2 is a positive integer less than the M.

In one embodiment, a pattern of the RS ports in a sub frame reuse a pattern of CSI-RS ports in a sub frame.

In one embodiment, the RS port is transmitted by P physical antennas deployed for the transmitting cell of the first RS in a precoding manner, and the P is a positive integer greater than 1.

The present invention discloses a base station equipment, and the base station includes:

a first module, for transmitting a first RS, wherein the first RS comprises M RS ports;

a second module, for receiving a backhaul signaling, wherein the backhaul signaling indicates M2 RS ports of the first RS;

a third module, for determining a precoding matrix according to the backhaul signaling; and a fourth module, for transmitting a downlink signal by adopting the precoding matrix in a precoding manner in a given resource;

wherein the M is a positive integer greater than 1, and the M2 is a positive integer less than the M.

In one embodiment, a pattern of the RS ports in a sub frame reuse a pattern of CSI-RS ports in a sub frame.

In one embodiment, the RS port is transmitted by P physical antennas deployed for the transmitting cell of the first RS in a precoding manner, and the P is a positive integer greater than 1.

The present invention discloses a user equipment, and the user equipment includes:

a first module, for receiving a first signaling, wherein the first signaling indicates the configuration information of a first RS, and the first RS comprises M RS ports;

a second module, for receiving the first RS; and a third module, for transmitting a second signaling, wherein the second signaling indicates M1 RS ports of the first RS;

wherein the M is a positive integer greater than 1, the M1 is a positive integer less than or equal to the M, and a transmitting cell of the first RS is a cell except a transmitting cell of the first signaling.

In one embodiment, a pattern of the RS ports in a sub frame reuse a pattern of CSI-RS ports in a sub frame.

In one embodiment, the RS port is transmitted by P physical antennas deployed for the transmitting cell of the first RS in a precoding manner, and the P is a positive integer greater than 1.

For a problem that the downlink precoding operation may bring a larger interference to the neighboring cell in the Massive MIMO system, the UE measures and feedbacks the RS port of the interference cell, and then the serving cell thereof notifies the interference cell through the backhaul signaling. The interference cell determines the precoding vector adopted by the precoding operation according to the RS ports indicated by the backhaul signaling, so as to reduce the interference of the neighboring cell as much as possible. The RS ports are sent by the antennas configured by the transmitting cell through the precoding mariner. The present invention effectively reduces the interference of the neighboring cell in the Massive MIMO transmission, and solves the problem of the SRS contamination. Meanwhile, the present invention is compatible with the existing LTE system as much as possible and has good compatibility.

BRIEF DESCRIPTION OF THE DRAWINGS

The above and other exemplary aspects, features and advantages of certain exemplary embodiments of the present invention will be more apparent from the following description taken in conjunction with the accompanying drawings, in which.

DETAILED DESCRIPTION

The following description with reference to the accompanying drawings is provided to explain the exemplary embodiments of the invention. Note that in the case of no conflict, the embodiments of the present invention and the features of the embodiments may be arbitrarily combined with each other.

Embodiment I

Figure 1:
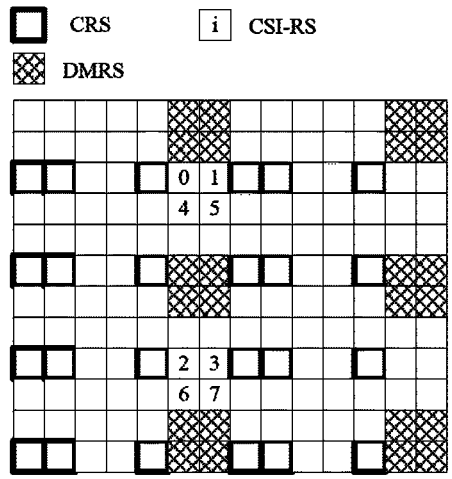
FIG. 1 is a diagram of a downlink RS pattern of an existing LTE system.
Figure 2:
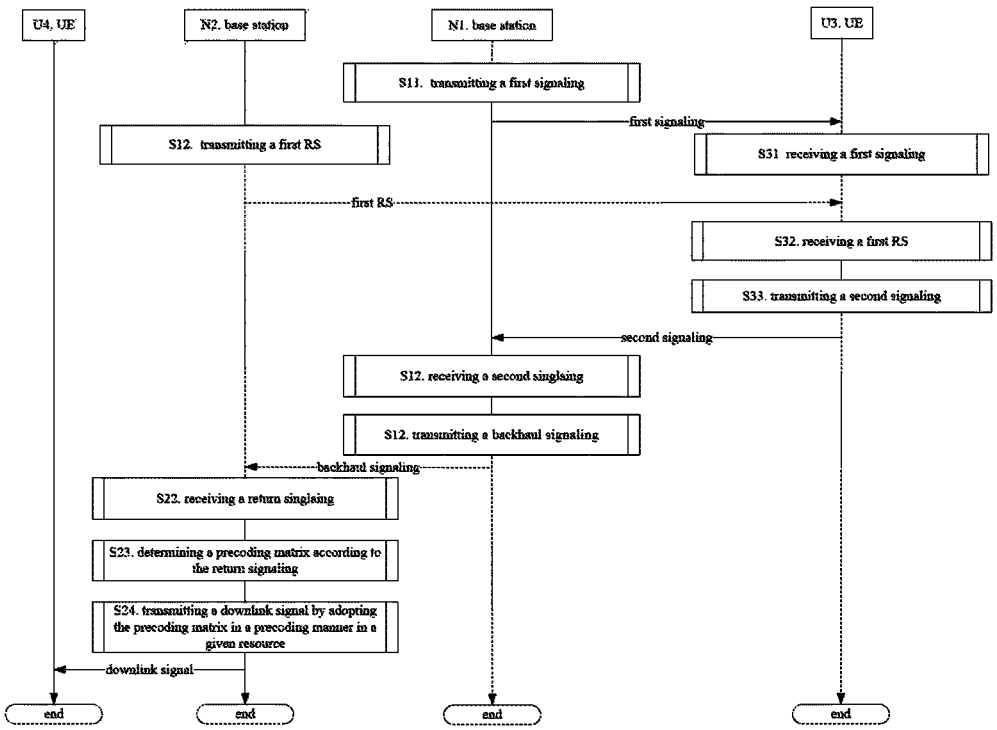
FIG. 2 is a flowchart of inter cell interference cancellation according to an embodiment of the present invention.

Embodiment I is a flowchart of inter cell interference cancellation, as shown in FIG. 2. In FIG. 2, a base station N1 is a maintenance base station of a serving cell of a UE U3.

For the base station N1, in step S11, the method involves transmitting a first signaling, in step S12, the method involves receiving a second signaling; in step S13, the method involves transmitting a backhaul signaling to a base station N2.

For the base station N2, in step S21, the method involves transmitting a first RS, in step S22, the method involves receiving a backhaul signaling; in step S23, the method involves determining a precoding matrix according to the backhaul signaling; in step S24, the method involves transmitting a downlink signal by adopting the precoding matrix in a precoding manner in a given resource.

For the UE U3, in step S31, the method involves receiving a first signaling; in step S32, the method involves receiving a first RS; in step S23, the method involves transmitting a second signaling.

In Embodiment I, the first signaling indicates the configuration information of the first RS, and the first RS includes M RS ports, the second signaling indicates M1 RS ports of the first RS, the backhaul signaling indicates M2 RS ports of the first RS, the M is a positive integer greater than 1, the M1 is a positive integer less than or equal to the M, and the M2 is a positive integer less than the M.

In a first exemplary embodiment of Embodiment I, the M1 RS ports are M1 RS ports with the best reception quality in a transmitting UE of the second signaling in the M RS ports.

In a second exemplary embodiment of Embodiment I, a pattern of the RS ports in a sub frame reuse a pattern of CSI-RS ports in a sub frame.

In a third exemplary embodiment of Embodiment I, the RS port is transmitted by P physical antennas deployed for the transmitting cell of the first RS in a precoding manner, and the P is a positive integer greater than 1.

In a fourth exemplary embodiment of Embodiment I, the first signaling is RRC layer signaling, the second signaling is RRC layer signaling, and the backhaul signaling is X2 interface signaling.

In a fifth exemplary embodiment of Embodiment I, the M2 RS ports include M1 RS ports and interference RS ports of the first RS reported by other UEs (the serving cell is maintained by the base station N1) received by the base station.

In a sixth exemplary embodiment of Embodiment I, the backhaul signaling designates the given resource, and the given resource is a frequency domain resource.

In a seventh exemplary embodiment of Embodiment, the M1 is configured by the base station N1 through a downlink signaling.

Embodiment II

Figure 3:
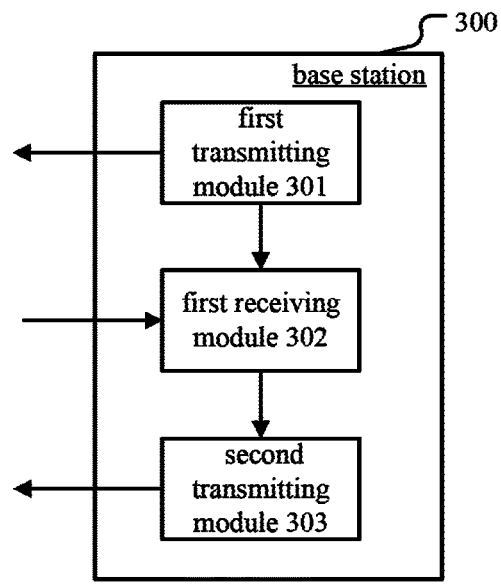
FIG. 3 is a structure diagram illustrating a processing apparatus used for an interfered base station according to an embodiment of the present invention.

Embodiment II is a structure diagram illustrating a processing apparatus used for an interfered base station, as shown in FIG. 3. In FIG. 3, a first processing apparatus 300 mainly includes a first transmitting module 301, a first receiving module 302 and a second transmitting module 303.

The first transmitting module 301 is used for transmitting a first signaling, wherein the first signaling indicates the configuration information of a first RS, and the first RS includes M RS ports; the first receiving module 302 is used for receiving a second signaling, wherein the second signaling indicates M1 RS ports of the first RS; the second transmitting module 303 is used for transmitting a backhaul signaling to a maintenance base station of the transmitting cell of the first RS, wherein the backhaul signaling indicates M2 RS ports of the first RS.

In Embodiment II, the M is a positive integer greater than 1, the M1 is a positive integer less than or equal to the M, a transmitting cell of the first RS is a cell except a transmitting cell of the first signaling, and the M2 is a positive integer less than the M. The RS port is transmitted by P physical antennas deployed for the transmitting cell of the first RS in a precoding manner, and the P is a positive integer greater than 8.

In a first exemplary embodiment of Embodiment II, the M1 RS ports are M1 RS ports with the best reception quality in a transmitting UE of the second signaling in the M RS ports, and the reception quality includes one or both of {RSRP, RSRQ}.

In a second exemplary embodiment of Embodiment II, a pattern of the RS ports in a sub frame reuse a pattern of CSI-RS ports in a sub frame, and the configuration information includes part or all information of CSI-RS-Config IE (Information Element).

Embodiment III

Figure 4:
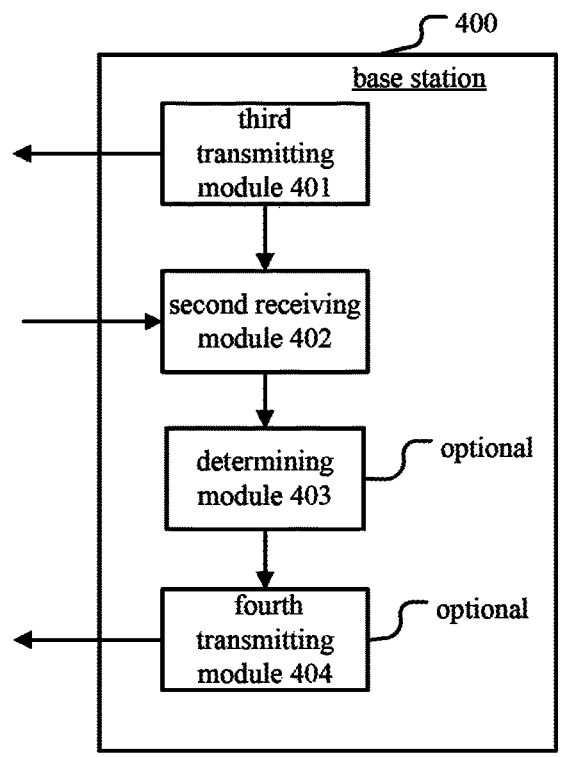
FIG. 4 is a structure diagram illustrating a processing apparatus used for an interference source base station according to another embodiment of the present invention.

Embodiment III is a structure diagram illustrating a processing apparatus used for an interference source base station, as shown in FIG. 4. In FIG. 4, a second processing apparatus 400 mainly includes a third transmitting module 401, a second receiving module 402, a determining module 403 and a fourth receiving module 404, wherein the determining module 403 and the fourth receiving module 404 are optional modules.

The third transmitting module 401 is used for transmitting a first RS, wherein the first RS includes M RS ports; the second receiving module 402 is used for receiving a backhaul signaling, wherein the backhaul signaling indicates M2 RS ports of the first RS; the determining module 403 is used for determining a precoding matrix according to the backhaul signaling; the fourth receiving module 404 is used for transmitting a downlink signal by adopting the precoding matrix in a precoding manner in a given resource.

In Embodiment III, the M is a positive integer greater than 1, and the M2 is a positive integer less than the M. The RS port is transmitted by P physical antennas deployed for the transmitting cell of the first RS in a precoding manner, the precoding matrix includes a positive integer number of precoding vectors, the precoding (column) vectors corresponding to the M2 RS ports are $v_1, v_2, \ldots, v_{M2}$ respectively, and the precoding matrix and $v_1, v_2, \ldots, v_{M2}$ are orthogonal. The P is a positive integer greater than 8. The backhaul signaling is transmitted through X2 interface.

Embodiment IV

Figure 5:
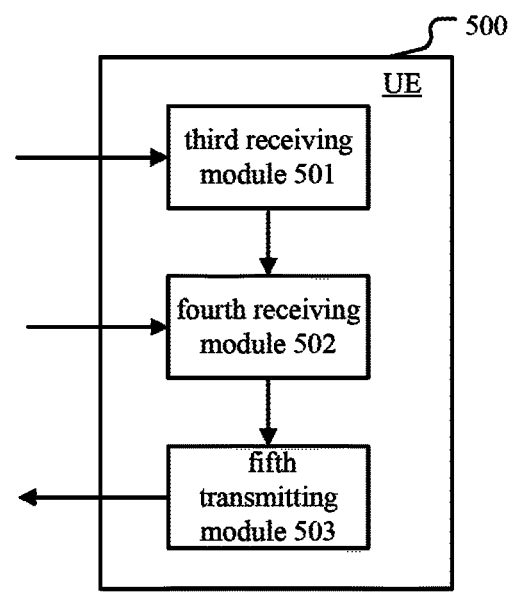
FIG. 5 is a structure diagram illustrating a processing apparatus used for a UE according to an embodiment of the present invention.

Embodiment IV a structure diagram illustrating a processing apparatus used for a UE, as shown in FIG. 5. In FIG. 5, a third processing apparatus 500 mainly includes a third receiving module 501, a fourth receiving module 502 and a fifth transmitting module 503.

The third receiving module 501 is used for receiving a first signaling, wherein the first signaling indicates the configuration information of a first RS, and the first RS includes M RS ports; the fourth receiving module 502 is used for receiving the first RS; the fifth transmitting module 503 is used for transmitting a second signaling, wherein the second signaling indicates M1 RS ports of the first RS.

In Embodiment IV, the M is a positive integer greater than 1, the M1 is a positive integer less than or equal to the M, and a transmitting cell of the first RS is a cell except a transmitting cell of the first signaling. The M1 RS ports are M1 RS ports with the best reception quality in a transmitting UE of the second signaling in the M RS ports. The RS port is transmitted by P physical antennas deployed for the transmitting cell of the first RS in a precoding manner, and the P is a positive integer greater than 1.

In an exemplary embodiment of Embodiment IV, the M1 is configurable.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present invention is not limited to any particular form of combination of software and hardware.

Although the present invention is illustrated and described with reference to specific embodiments, those skilled in the art will understand that many variations and modifications are readily attainable without departing from the spirit and scope thereof as defined by the appended claims and their legal equivalents.

What is claimed is:

1. A large-scale Multiple Input Multiple Output (MIMO) communication method in a base station comprising:
   step A: transmitting a first signaling, wherein the first signaling indicates the configuration information of a first Reference Signal (RS), and the first RS comprises M RS ports; and
   step B: receiving a second signaling, wherein the second signaling indicates M1 RS ports of the first RS;
   wherein the M is a positive integer greater than 1, the M1 is a positive integer less than or equal to the M, and a transmitting cell of the first RS is a cell except a transmitting cell of the first signaling.

2. The large-scale MIMO communication method in the base station according to claim 1, further comprising:
   step C: transmitting a backhaul signaling to a maintenance base station of the transmitting cell of the first RS, wherein the backhaul signaling indicates M2 RS ports of the first RS;
   wherein the M2 is a positive integer less than the M.

3. The large-scale MIMO communication method in the base station according to claim 2 wherein a pattern of the RS ports in a sub frame reuse a pattern of CSI-RS ports in a sub frame or the RS port is transmitted by P physical antennas deployed for the transmitting cell of the first RS in a precoding manner, and the P is a positive integer greater than 1.

4. The large-scale MIMO communication method in the base station according to claim 1, wherein the M1 RS ports are M1 RS ports with the best reception quality in a transmitting User Equipment (UE) of the second signaling in the M RS ports.

5. The large-scale MIMO communication method in the base station according to claim 4 wherein a pattern of the RS ports in a sub frame reuse a pattern of CSI-RS ports in a sub frame or the RS port is transmitted by P physical antennas deployed for the transmitting cell of the first RS in a precoding manner, and the P is a positive integer greater than 1.

6. The large-scale MIMO communication method in the base station according to claim 1, wherein a pattern of the RS ports in a sub frame reuse a pattern of Channel Status Information Reference Signal (CSI-RS) ports in a sub frame or the RS port is transmitted by P physical antennas deployed for the transmitting cell of the first RS in a precoding manner, and the P is a positive integer greater than 1.

7. A large-scale Multiple Input Multiple Output (MIMO) communication method in a base station comprising:
- step A: transmitting a first Reference Signal (RS), wherein the first RS comprises M RS ports; and
- step B: receiving a backhaul signaling, wherein the backhaul signaling indicates M2 RS ports of the first RS;
- wherein the M is a positive integer greater than 1, and the M2 is a positive integer less than the M.

8. The large-scale MIMO communication method in the base station according to claim 7, further comprising:
- step C: determining a precoding matrix according to the backhaul signaling; and
- step D: transmitting a downlink signal by adopting the precoding matrix in a precoding manner in a given resource.

9. The large-scale MIMO communication method in the base station according to claim 8, wherein a pattern of the RS ports in a sub frame reuse a pattern of CSI-RS ports in a sub frame or the RS port is transmitted by P physical antennas deployed for the transmitting cell of the first RS in a precoding manner, and the P is a positive integer greater than 1.

10. The large-scale MIMO communication method in the base station according to claim 7, wherein a pattern of the RS ports in a sub frame reuse a pattern of Channel Status Information Reference Signal (CSI-RS) ports in a sub frame or the RS port is transmitted by P physical antennas deployed for the transmitting cell of the first RS in a precoding manner, and the P is a positive integer greater than 1.

11. A large-scale Multiple Input Multiple Output (MIMO) communication method in a User Equipment (UE) comprising:
- step A: receiving a first signaling, wherein the first signaling indicates the configuration information of a first Reference Signal (RS), and the first RS comprises M RS ports;
- step B: receiving the first RS; and
- step C: transmitting a second signaling, wherein the second signaling indicates M1 RS ports of the first RS;
- wherein the M is a positive integer greater than 1, the M1 is a positive integer less than or equal to the M, and a transmitting cell of the first RS is a cell except a transmitting cell of the first signaling.

12. The large-scale MIMO communication method in the UE according to claim 11, wherein the M1 RS ports are M1 RS ports with the best reception quality in a transmitting UE of the second signaling in the M RS ports.

13. The large-scale MIMO communication method in the UE according to claim 11, wherein a pattern of the RS ports in a sub frame reuse a pattern of Channel Status Information Reference Signal (CSI-RS) ports in a sub frame.

14. The large-scale MIMO communication method in the UE according to claim 11, wherein the RS port is transmitted by P physical antennas deployed for the transmitting cell of the first RS in a precoding manner, and the P is a positive integer greater than 1.

15. A base station comprising:
- a first module, for transmitting a first signaling, wherein the first signaling indicates the configuration information of a first Reference Signal (RS), and the first RS comprises M RS ports;
- a second module, for receiving a second signaling, wherein the second signaling indicates M1 RS ports of the first RS; and
- a third module, for transmitting a backhaul signaling to a maintenance base station of the transmitting cell of the first RS, wherein the backhaul signaling indicates M2 RS ports of the first RS;
- wherein the M is a positive integer greater than 1, the M1 is a positive integer less than or equal to the M, a transmitting cell of the first RS is a cell except a transmitting cell of the first signaling, and the M2 is a positive integer less than the M.

16. A base station equipment comprising:
- a first module, for transmitting a first Reference Signal (RS), wherein the first RS comprises M RS ports;
- a second module, for receiving a backhaul signaling, wherein the backhaul signaling indicates M2 RS ports of the first RS;
- a third module, for determining a precoding matrix according to the backhaul signaling; and
- a fourth module, for transmitting a downlink signal by adopting the precoding matrix in a precoding manner in a given resource;
- wherein the M is a positive integer greater than 1, and the M2 is a positive integer less than the M.

17. A user equipment comprising:
- a first module, for receiving a first signaling, wherein the first signaling indicates the configuration information of a first Reference Signal (RS), and the first RS comprises M RS ports;
- a second module, for receiving the first RS; and
- a third module, for transmitting a second signaling, wherein the second signaling indicates M1 RS ports of the first RS;
- wherein the M is a positive integer greater than 1, the M1 is a positive integer less than or equal to the M, and a transmitting cell of the first RS is a cell except a transmitting cell of the first signaling.

* * * * *